(12) United States Patent
Cheng

(10) Patent No.: US 6,659,653 B2
(45) Date of Patent: Dec. 9, 2003

(54) OPTICAL FIBER PLUG WITH AN INDICATING FUNCTION

(76) Inventor: Yu-Feng Cheng, No. 7, Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 44 days.

(21) Appl. No.: 10/113,268

(22) Filed: Apr. 1, 2002

(65) Prior Publication Data

US 2003/0185521 A1 Oct. 2, 2003

(51) Int. Cl.[7] ................................................. G02B 6/36
(52) U.S. Cl. ...................................................... 385/77
(58) Field of Search .......................... 385/139, 53, 76, 385/77, 78, 88, 92

(56) References Cited

U.S. PATENT DOCUMENTS 5,259,056 A * 11/1993 Davenport et al. ......... 385/115
6,454,466 B1 * 9/2002 Weigel et al. ................ 385/80
6,565,264 B1 * 5/2003 Johnson et al. .............. 385/78

* cited by examiner

*Primary Examiner*—Lynn Feild
*Assistant Examiner*—Phuong K Dinh
(74) *Attorney, Agent, or Firm*—Alan D. Kamrath; Rider Bennett, LLP

(57) ABSTRACT

An optical fiber plug has an inner sleeve made of a transparent or semi-transparent material. The inner sleeve has a head formed at a front end thereof. A passage is longitudinally defined through the head. A tubular part is formed at a rear end of the inner sleeve. A chamber is defined in the tubular part and in communication with the passage. A flange is formed between the head and the tubular part. A tapering recess of which a cross section is polygonal is defined between the passage and the chamber. An outer sleeve covers on the tubular part of the inner sleeve. A core extends through the passage, the tapering recess, and the chamber.

7 Claims, 3 Drawing Sheets

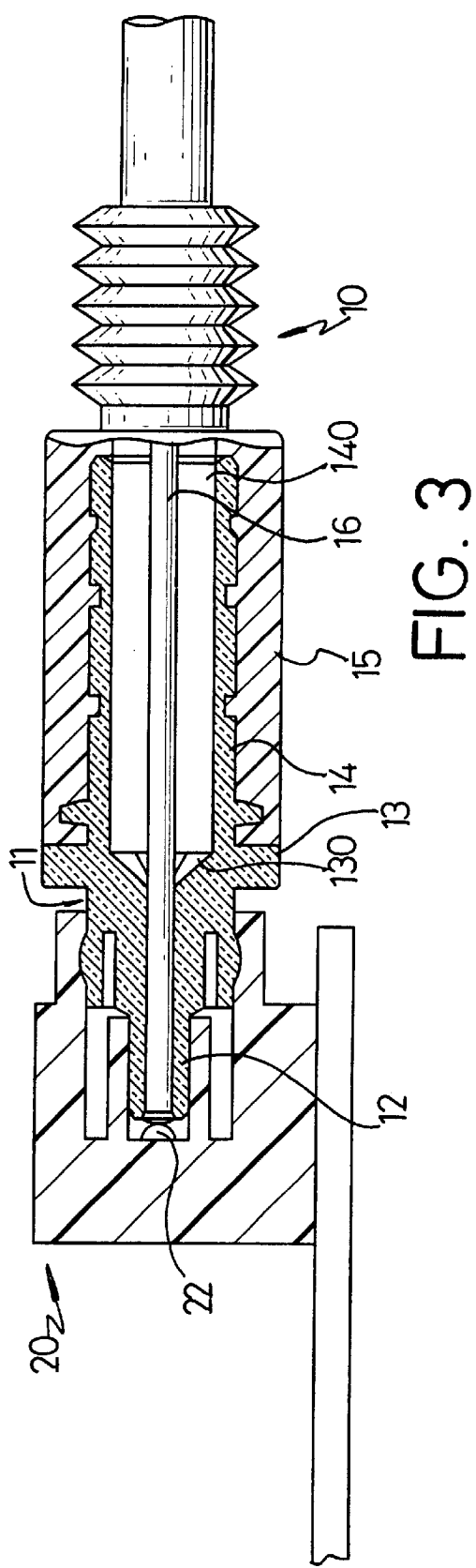
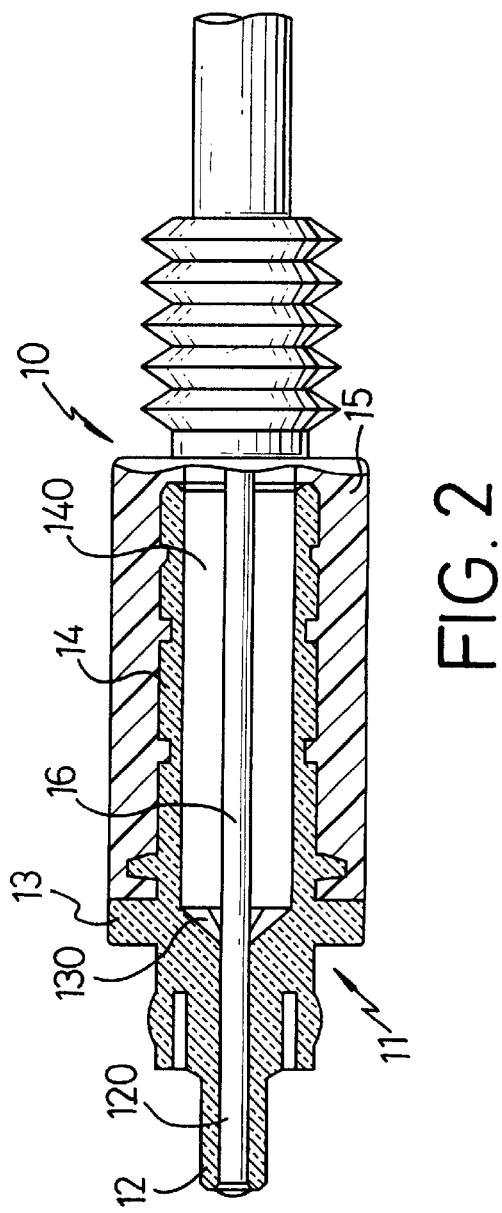
FIG. 3
FIG. 2

OPTICAL FIBER PLUG WITH AN INDICATING FUNCTION

BACKGROUND OF THE INVENTION

1. Field of the Invention

The present invention is related to an optical fiber plug, and more particularly to an optical fiber plug that has a function to indicate whether there is light radiated from a source connected with the plug.

2. Description of Related Art

In communication equipment, AV equipment etc., optical fibers have been used for transmitting signals because of the superior quality of signal in comparison with conventional wires such as copper. Plugs for optical fibers are provided at ends of the optical fibers for connecting these devices.

Conventional plugs are made of opaque materials. When the conventional plugs are connected with a light source, it is impossible to know whether there is light radiated from the light source unless the plugs are disconnected from the light source. It is very inconvenient for a user to disconnect and connect repeatedly, especially in the case where the light source is installed on walls.

Therefore, the invention provides an optical fiber plug to mitigate and/or obviate the aforementioned problems.

SUMMARY OF THE INVENTION

The main objective of the invention is to provide an optical fiber plug that has a function to indicate whether there is light radiated from a source connected with the plug.

Other objects, advantages and novel features of the invention will become more apparent from the following detailed description when taken in conjunction with the accompanying drawings.

BRIEF DESCRIPTION OF THE DRAWINGS

FIG. 2 is a sectional view of the optical fiber plug of FIG. 1;

FIG. 3 is a sectional view showing the optical fiber plug connected with a light source.

DETAILED DESCRIPTION OF THE PREFERRED EMBODIMENT

Figure 1:
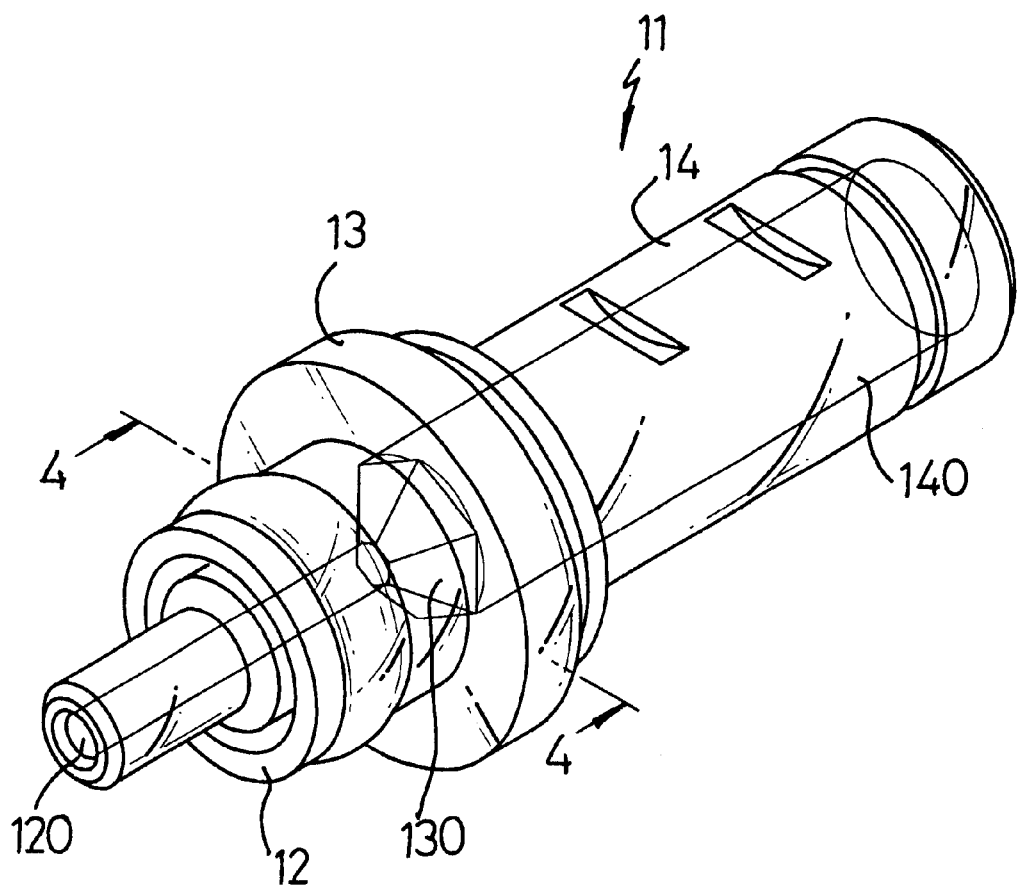
FIG. 1 is a perspective view of an optical fiber plug in accordance with the invention.

Referring to FIGS. 1 and 2, an optical fiber plug (10) in accordance with the invention has an inner sleeve (11) made up of a semi-transparent or transparent material. The inner sleeve (11) has a head (12) formed at a first end thereof and a tubular part (14) formed at a second end thereof. The head (12) has a passage (120) longitudinally defined therethrough and the tubular part (14) has a chamber (140) defined therein and in communication with the passage (120). A flange (13) is formed between the head (12) and the tubular part (14). A tapering recess (130) of which a cross section is polygonal is defined between the passage (120) and the chamber (140). The tapering recess (130) is radially aligned with the flange (13). A core (16) is extended through the passage (120), the tapering recess (130) and the chamber (140).

An outer sleeve (15) is provided on the tubular part (14) of the inner sleeve (11).

Referring to FIG. 3, when the plug (10) is inserted in a socket (20) in which a light source (22) is provided, the core (16) is aligned with the light source (22). Light from the source (22) is conducted to the tapering recess (130) along the head (12). Refracted by the polygonal recess (130), light radiates from the flange (13) and can be seen. Therefore, it is known whether the light source (22) radiates light.

In this embodiment, the light source (22) is an LED. It should be understood that other types of light source such as a signal source (not shown or numbered) is also applicable to the invention.

Figure 4B:
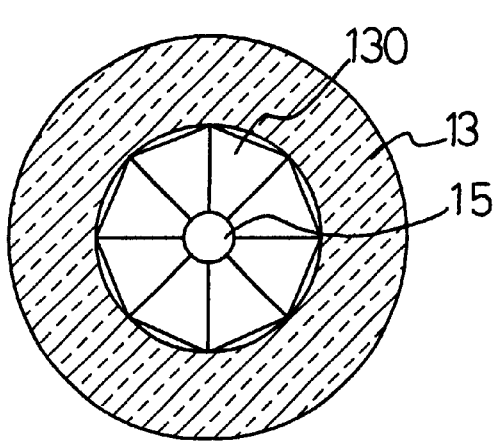
FIG. 4 is a schematic view of a cross section of the optical fiber plug along "4—4" in FIG. 1.
Figure 4D:
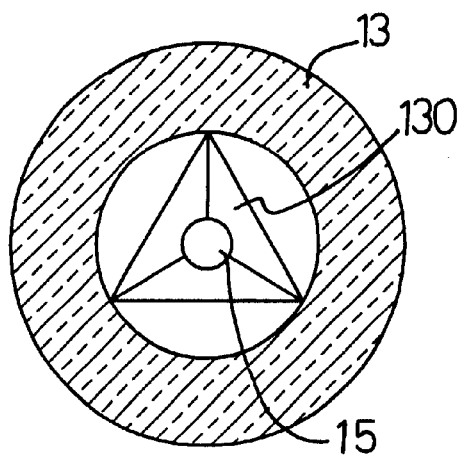
Figure 4A:
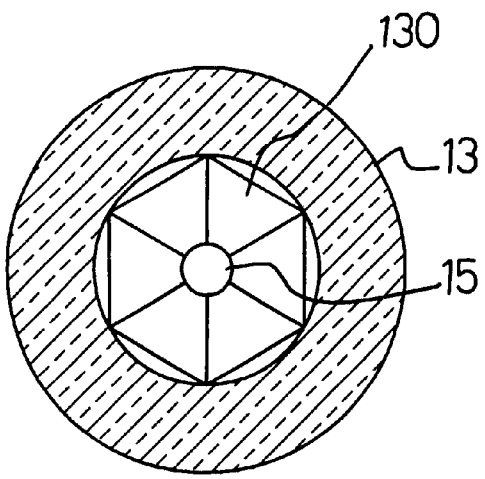
Figure 4C:
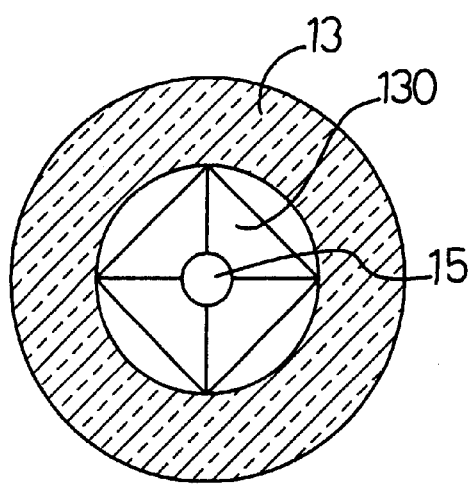

Referring to FIG. 4, the cross section of the tapering recess (130) can be a hexagon (FIG. 4A), an octagon (FIG. 4B), a quadrangle (FIG. 4C), and a triangle (FIG. 4D).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber plug, comprising:

an inner sleeve (11) made of an optical-conductive, material, the inner sleeve (11) having a head (12) formed at a front end thereof, a passage (120) longitudinally defined through the head (12), a tubular part (14) formed at a rear end thereof, a chamber (140) defined in the tubular part (14) and in communication with the passage (120), a flange (13) formed between the head (12) and the tubular part (14), and a tapering recess (130) of which a cross section is polygonal defined between the passage (120) and the chamber (140);

an outer sleeve (15) covering on the tubular part (14) of the inner sleeve (11); and a core (16) extending through the passage (120), the tapering recess (130), and the chamber (140).

2. The optical fiber plug as claimed in claim 1, wherein the optical-conductive any material is a transparent material.

3. The optical fiber plug as-claimed in claim 1, wherein the optical-conductive material is a semi-transparent material.

4. The optical fiber plug as claimed in claim 1, wherein the cross section of the tapering recess (130) is a hexagon.

5. The optical fiber plug as claimed in claim 1, wherein the cross section of the tapering recess (130) is an octagon.

6. The optical fiber plug as claimed in claim 1, wherein the cross section of the tapering recess (130) is a quadrangle.

7. The optical fiber plug as claimed in claim 1, wherein the cross section of the tapering recess (130) is a triangle.

* * * * *